(12) United States Patent
McGeachie

(10) Patent No.: US 6,697,807 B2
(45) Date of Patent: Feb. 24, 2004

(54) METHOD OF AND SYSTEM FOR COMPARING DATABASE RECORDS TO DETERMINE CONNECTIONS BETWEEN PARTIES OVER A NETWORK

(75) Inventor: John S. McGeachie, North Reading, MA (US)

(73) Assignee: Orions Belt, Inc., Sudbury, MA (US)

( * ) Notice: Subject to any disclaimer, the term of this patent is extended or adjusted under 35 U.S.C. 154(b) by 213 days.

(21) Appl. No.: 09/882,170

(22) Filed: Jun. 15, 2001

(65) Prior Publication Data

US 2002/0023090 A1 Feb. 21, 2002

Related U.S. Application Data

(60) Provisional application No. 60/211,725, filed on Jun. 15, 2000.

(51) Int. Cl.[7] .............................................. G06F 17/30
(52) U.S. Cl. .......................................... 707/10; 707/3
(58) Field of Search .......................... 707/103, 10, 200, 707/3

(56) References Cited

U.S. PATENT DOCUMENTS

| | | | |
|---|---|---|---|
| 5,915,252 A | 6/1999 | Misheski et al. | ............ 707/103 |
| 6,014,670 A | 1/2000 | Zamanian et al. | ........... 707/101 |
| 6,058,394 A | 5/2000 | Bakow et al. | ................. 707/10 |
| 6,134,559 A | 10/2000 | Brumme et al. | ............. 707/103 |

OTHER PUBLICATIONS

PCT Internationl Search Report, International Filing Date Jun. 15, 2001, Mailing Date Oct. 18, 2001, International Application No. PCT/US01/19329.

Primary Examiner—Jean M. Corrielus
(74) Attorney, Agent, or Firm—McDermott, Will & Emery

(57) ABSTRACT

A method and system for determining a connection between a source party and a target party includes constructing a host database that includes a plurality of records, each record including a number of data fields containing identification information of a party, such that the identification information is extracted from non-restricted sources. A client database is constructed that includes a plurality of records, each record including a number of data fields containing identification information of a party, such that the identification information is extracted from a client's private sources. Identification information of a source party and a target party is received. A record in the client database is identified that includes identification information of the source party, and a record in the host database is identified that includes identification information of the target party. The data fields in the records of at least one of the client database and the host database are searched to locate identification information commonalties between the source party record and at least one intermediate party record. The data fields in the records of at least one of the client database and the host database are searched to locate identification information commonalties between the at least one intermediate party record and the target party record. Upon locating at least one identification information commonality between the at least one intermediate party record and the target party record, a list is generated that includes the at least one intermediate party record.

19 Claims, 7 Drawing Sheets

Name: J.F.
Age: 47
Address: 145 Executive Drive
Boston, MA 02109
Relationship 1: CTO, (Company A)
(1998-present)
Relationship 2: CTO, Company D
(1994-1998)

202

Name: C.O.
Age: 33
Address: 38 Brook Drive
Dover, MA 02314
Relationship 1: CTO, [Company F]
(1999-present)
Relationship 2: COO, (Company A)
(1997-1999)

206

Name: L.S.
Age: 42
Address: 14 Berkeley Street
Brighton, MA 02314
Relationship 1: CFO, [Company F]
(1998-present)
Relationship 2: CTO, Company M
(1996-1998)
Relationship 3: CTO, Company K
(1992-1996)

Entity Name: Company A

Ticker Symbol: COMA

Address: 145 Executive Drive
Boston, MA 02109

Company Executives: J.K., CEO
J.F., CTO
F.S., DIR

METHOD OF AND SYSTEM FOR COMPARING DATABASE RECORDS TO DETERMINE CONNECTIONS BETWEEN PARTIES OVER A NETWORK

CROSS-REFERENCED APPLICATIONS

This application claims the benefit U.S. application Ser. No. 60/211,725, filed Jun. 15, 2000, the disclosure of which is hereby incorporated by reference into this application.

FIELD OF THE INVENTION

The present invention relates generally to a method of and system for determining connections between parties and, more particularly, to a connection searching method and system in which a user is capable of entering a source party and a target party and searching a host database to obtain lists of people or entities through which the source and target parties are connected. The system also is capable of determining a number of connections that are associated with one party.

BACKGROUND OF THE INVENTION

It is well known that personal contacts are advantageous when conducting transactions between parties. However, determining the contacts of one party of a transaction the contacts of the other party of the transaction and what contacts those contacts have in common can be very difficult and time consuming. Currently, there is no efficient method or system for determining such contacts between parties of a transaction.

SUMMARY OF THE INVENTION

The present invention is directed to a method of and system for determining connections between people which is efficient and effective. The system includes a host database which includes records of parties, including identification information, which is available from non-restricted sources. The identification information is arranged in a series of searchable data fields. A user connects to a website associated with the system and inputs a source party and a target party, for the purpose of finding a number of connections between the parties. The parties may be people or entities, such as companies, organizations, etc. The system searches the database for intermediate party records having at least one data field which includes identification information which is common to the identification information in at least one of the data fields of the source party record. The located party records are compared to the target party record to determine if any of the identification information in the intermediate party record is common to any of the identification information in the target party record. If there is a commonality, a list of the source party, intermediate party and target party is generated, including the records for each party, to show the connection path between the source party and the target party. If there are no commonalities between the intermediate party and the target party, further intermediate parties are located which have commonalities with the first intermediate party. The located party records are then compared to the target party record to determine if any of the identification information in the further intermediate part records are common to any of the identification information in the target party record. If there is a commonality, a list of the source party, intermediate parties and target party is generated, including the records for each party, to show the connection path between the source party and the target party. This process is repeated until no further connections are found or until a preset limit of connections is reached.

According to one aspect of the invention, a method of determining a connection between a source party and a target party includes:

A. constructing a host database, the host database including a plurality of records, each record including a number of data fields, each of the data fields including identification information of a party, the identification information being extracted from non-restricted sources;

B. constructing a client database, the client database including a plurality of records, each record including a number of data fields, each of the data fields including identification information of a party, the identification information being extracted from a client's private sources;

C. receiving identification information of a source party and a target party;

D. identifying a record in the client database including identification information of the source party;

E. identifying a record in the host database including identification information of the target party;

F. searching the data fields in the records of at least one of the client database and the host database to locate identification information commonalities between the source party record and at least one intermediate party record;

G. searching the data fields in the records of at least one of the client database and the host database to locate identification information commonalities between the at least one intermediate party record and the target party record; and H. upon locating at least one identification information commonality between the at least one intermediate party record and the target party record, generating a list including the at least one intermediate party record.

Step G may further include searching the data fields in the records of at least one of the client database and the host database to locate identification information commonalities between the at least one intermediate party records and further intermediate party records; and searching the data fields in the records of at least one of the client database and the host database to locate identification information commonalities between the further intermediate party records and the target party record.

The source party and the target party may be one of a person and an entity. The identification information may include personal and affiliation information of the party.

The identification information may include at least one of a person's name, the person's dates of employment with a company, the person's title within the company, the person's company name, the person's company address, the person's company SIC code, and the person's company ticker symbol. The identification information may include at least one of a company name, the company's address, the company's SIC code and the company's ticker symbol. The records stored on the client database may be a subset of the records stored on the host database.

According to another aspect of the invention, a method of determining a connection between a source party and a target party includes:

A. constructing a host database, the host database including a plurality of records, each record including a number of data fields, each of the data fields including identification information of a party, the identification information being extracted from non-restricted sources;

B. receiving identification information of a source party and a target party;

C. identifying a record in the host database including identification information of the source party;

D. identifying a record in the host database including identification information of the target party;

E. searching the data fields in the records of the host database to locate identification information commonalities between the source party record and at least one intermediate party record;

F. searching the data fields in the records of the host database to locate identification information commonalities between the at least one intermediate party record and the target party record; and G. upon locating a data field commonality between the at least one intermediate party record and the target party record, generating a list of the at least one intermediate party record.

According to another aspect of the invention, a system for determining a connection between a source party and a target party includes a host system having a computer processor and associated memory. The host system includes a host database including a plurality of records, each record including a number of data fields, each of the data fields including identification information of a party, the identification information being extracted from non-restricted sources. The system also includes a client system having a computer processor and associated memory, the client system including a client database including a plurality of records, each record including a number of data fields, each of the fields including identification information of a party, the identification information being extracted from a client's private sources. The client system establishes a connection to the host system over the communication network and inputs identification information of a source party and a target party. The host system identifies a record in at least on of the client database and the host database including identification information of the source party and identifying a record in at least one of the client database and the host database including identification information of the target party; and the host system searching the data fields in the records to locate identification information commonalities between the source party record and at least one intermediate party record and searching the data fields in the records to locate identification information commonalities between the at least one intermediate party record and the target party record. Upon locating a identification information commonality between the at least one intermediate party record and the target party record, the host system generating a list of the at least one intermediate party record.

According to yet another aspect of the invention, a system for determining a connection between a source party and a target party includes a host system including a computer processor and associated memory and a user system including a computer processor and associated memory. The host system includes a database having a plurality of records, each record including a number of data fields, each of the data fields including identification information of a party, the identification information being extracted from non-restricted sources. The user system is adapted for establishing a connection to the host system over a communication network and inputting identification information of a source party and a target party to the host system. The host system identifies records in the database including identification information of the source party identification information of the target party and searches the data fields in the records to locate identification information commonalities between the source party record and at least one intermediate party record and searching the data fields in the records to locate identification information commonalities between the at least one intermediate party record and the target party record. Upon locating a identification information commonality between the at least one intermediate party record and the target party record, the host system generating a list of the at least one intermediate party record.

According to yet another aspect of the invention, a method of determining a connection between a source party and a target party includes:

A. receiving identification information of a source party and a target party;

B. identifying a record in the client database including identification information of the source party, the client database including a plurality of records, each record including a number of data fields, each of the data fields including identification information of a party;

C. identifying a record in the host database including identification information of the target party, the host database including a plurality of records, each record including a number of data fields, each of the data fields including identification information of a party;

D. searching the data fields in the records of at least one of the client database and the host database to locate identification information commonalities between the source party record and at least one intermediate party record;

E. searching the data fields in the records of at least one of the client database and the host database to locate identification information commonalities between the at least one intermediate party record and the target party record; and F. upon locating at least one identification information commonality between the at least one intermediate party record and the target party record, generating a list including the at least one intermediate party record.

According to yet another aspect of the invention, a method of determining a connection between a source party and a target party includes:

A. receiving identification information of a source party and a target party;

B. identifying a record in the host database including identification information of the source party, the host database including a plurality of records, each record including a number of data fields, each of the data fields including identification information of a party, the identification information being extracted from non-restricted sources;

C. identifying a record in the host database including identification information of the target party;

D. searching the data fields in the records of the host database to locate identification information commonalities between the source party record and at least one intermediate party record;

E. searching the data fields in the records of the host database to locate identification information commonalities between the at least one intermediate party record and the target party record; and F. upon locating a data field commonality between the at least one intermediate party record and the target party record, generating a list of the at least one intermediate party record.

According to yet another aspect of the invention, a system for determining a connection between a source party and a target party includes a host system including a computer processor and associated memory and a user system including a computer processor and associated memory. The host system includes a database having a plurality of records, each record including a number of data fields, each of the data fields including identification information of a party. The user system is adapted for establishing a connection to the host system over a communication network, the user system inputting identification information of a source party and a target party to the host system. The host system identifies records in the database including identification information of the source party identification information of the target party and searches the data fields in the records to locate identification information commonalities between the source party record and at least one intermediate party record and searching the data fields in the records to locate identification information commonalities between the at least one intermediate party record and the target party record. Upon locating a identification information commonality between the at least one intermediate party record and the target party record, the host system generating a list of the at least one intermediate party record.

BRIEF DESCRIPTION OF THE DRAWINGS

The foregoing and other objects of this invention, the various features thereof, as well as the invention itself may be more fully understood from the following description when read together with the accompanying drawings in which.

Figure 1:
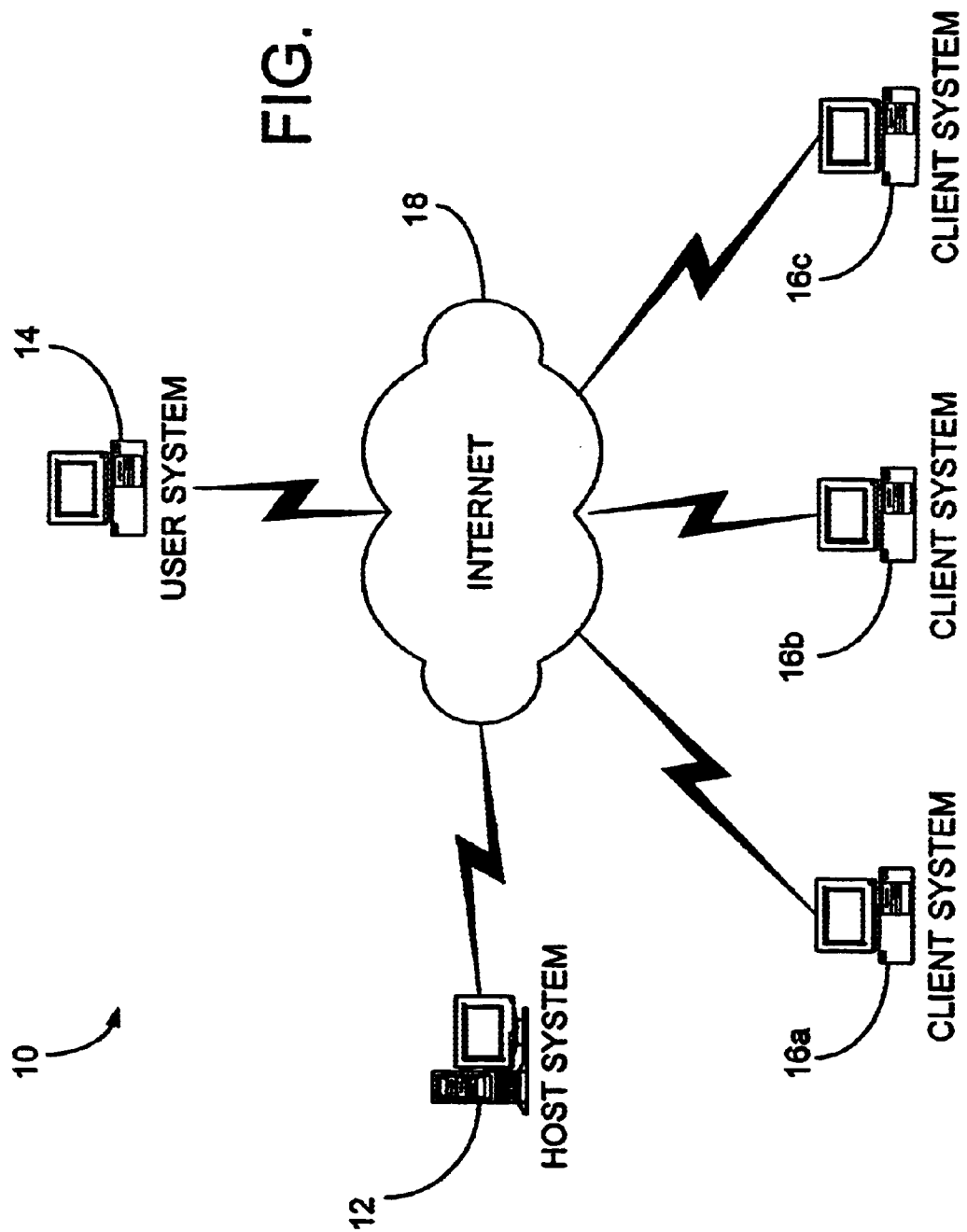
FIG. 1 is a schematic diagram of a system for determining connections between parties in accordance with the present invention.
Figure 4:
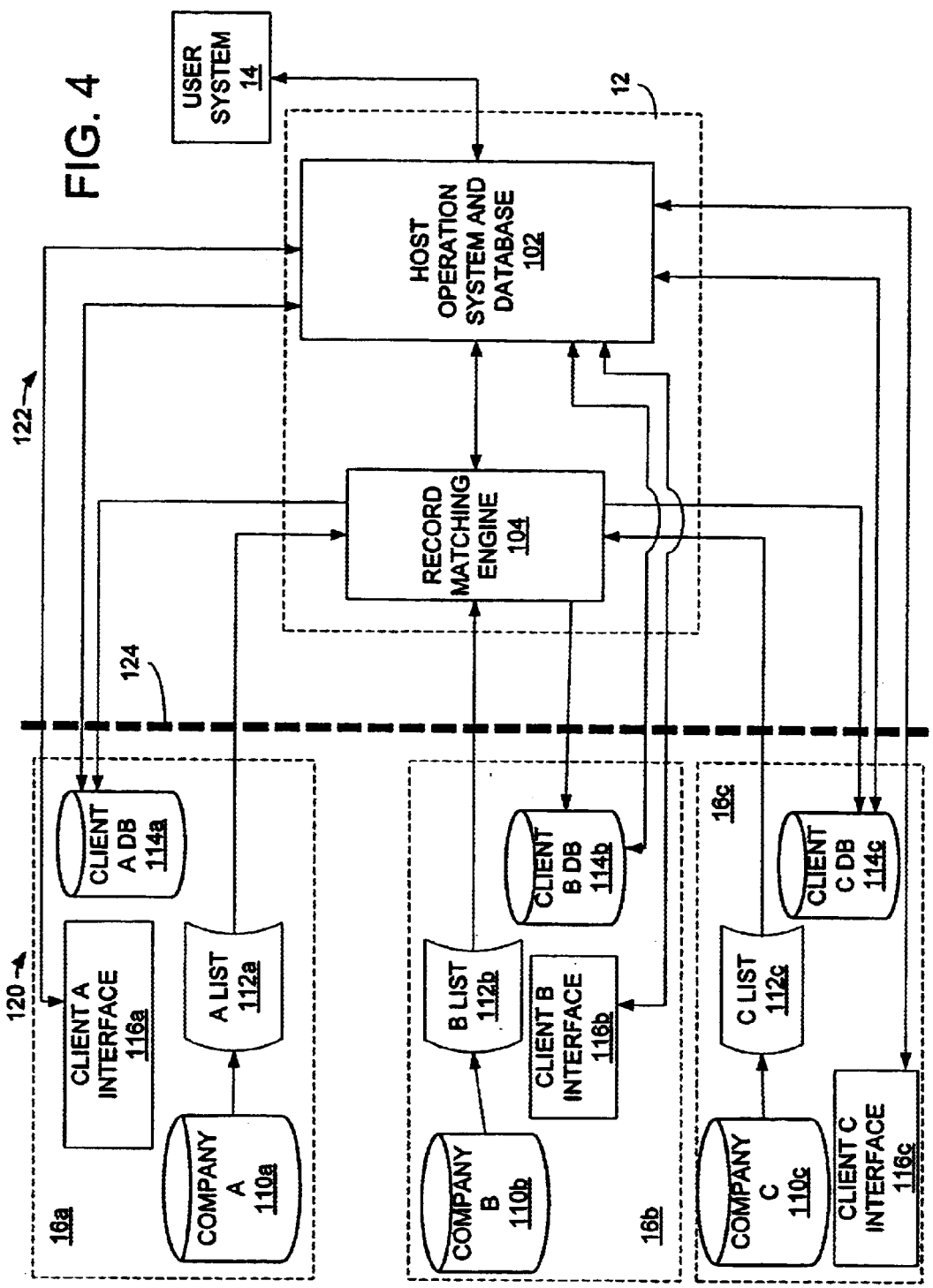
Figure 5:
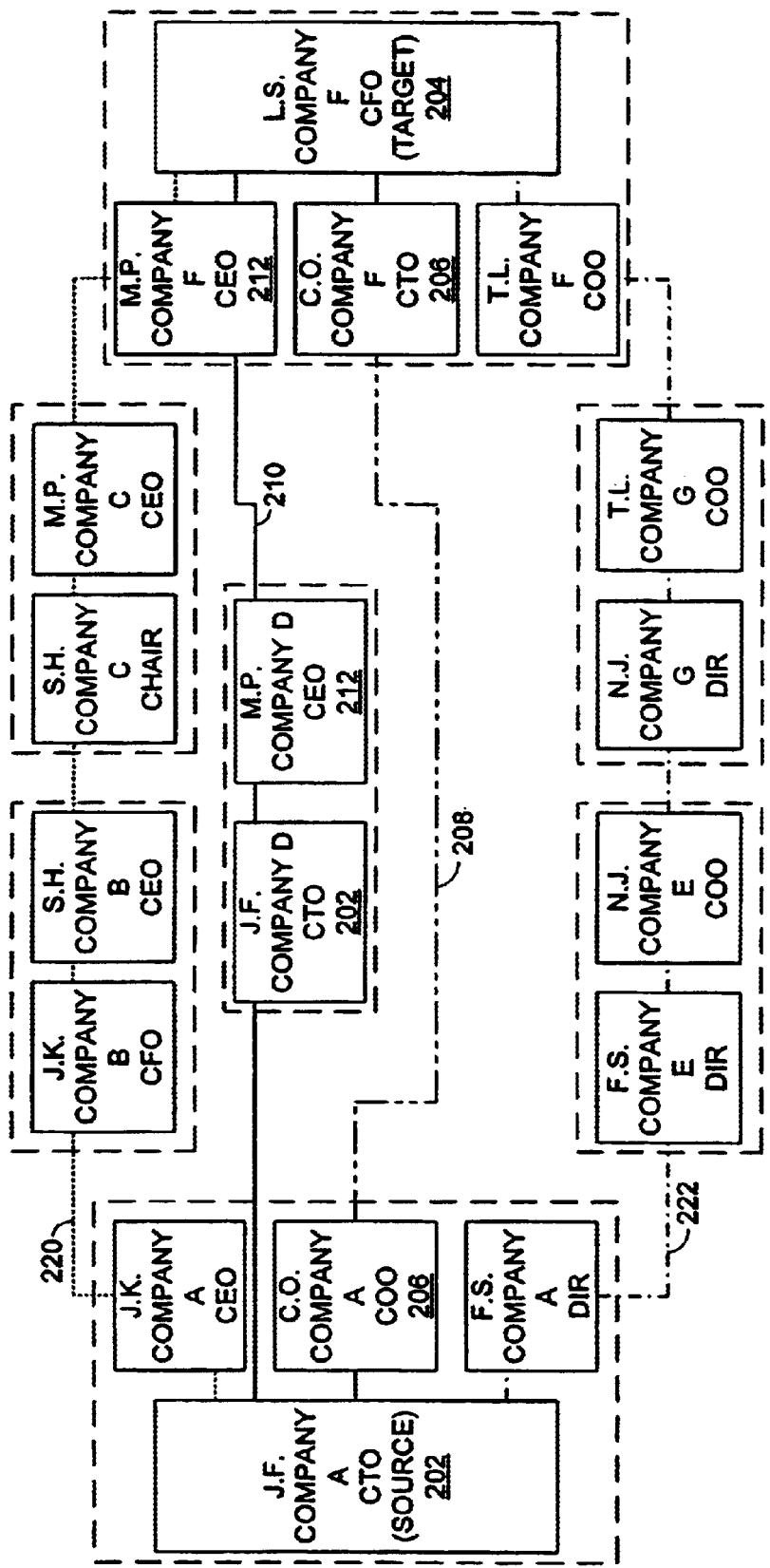

FIG. is a flow diagram showing another embodiment of a method for determining connections between parties in accordance with the present invention;

FIG. 4 is a detailed schematic diagram of the system for determining connections between parties shown in FIG. 1;

FIG. 5 is a schematic diagram showing a list of connections determined according to the present invention;

FIG. 6 is a more detailed schematic diagram of records of the parties involved in one of the connections shown in FIG. 5; and FIG. 7 is a schematic diagram showing identification information included in a record of an entity, according to the present invention.

DETAILED DESCRIPTION

FIG. 1 shows a schematic diagram of a system 10 for determining connections between parties in accordance with a preferred embodiment of the present invention. The system 10 includes host system 12, user system 14 and client systems 16a–16c, all connected to a common communications network 18. While three client systems 16a–16c are shown in FIG. 1, it will be understood that as few as one client system may participate in the study, or many more than three may participate. Three client systems are shown in FIG. 1 for the purpose of example only. Preferably, the host system 12, user system 14 and client systems 16a–16c are each a personal computer such as an IBM PC or IBM PC compatible system or an APPLE® MacINTOSH® system or a more advanced database computer system such as an Alpha-based computer system available from Compaq Computer Corporation or SPARC® Station computer system available from SUN Microsystems Corporation, although a main frame computer system can also be used. Preferably, the communications network 18 is a TCP/IP-based network such as the Internet or an intranet, although almost any well known LAN, WAN or VPN technology can be used.

In one preferred embodiment of the invention, the user system 14 is an IBM PC compatible system operating an operating system such as the Microsoft Windows® operating system, and host system 12 is configured as a web server providing access to information such as web pages in HTML format via a protocol such as the HyperText Transport Protocol (http). The user system 14 and client systems 16a–16c include software to allow viewing of web pages, commonly referred to as a web browser, thus being capable of accessing web pages located on host system 12. Alternatively, user system 14 and client system 16a–16c can be any wired or wireless device that can be connected to a communications network, such as an interactive television system, including WEBTV, a personal digital assistant (PDA) or a cellular telephone.

The method of and system for determining connections between parties will now be described with reference to FIGS. 2–7. FIG. 4 is a schematic block diagram showing a more detailed diagram of the system 10 of FIG. 1. As shown in FIG. 4, host system 12 includes a host operation system and database 102 and a record matching engine 104. As shown in the figure, the client systems 16a–16c are separate entities, each having a firewall, represented by dashed line 124. The client systems 16a–16c are located on the client side 120 of the firewall 124 and the host system 12 is located on the host side 122 of the firewall 124. Each of client systems 16a–16c include a company database 110 in which contacts of employees and officers of the company are stored. Typical contact programs which are used for storing contacts include ACT®, Outlook®, Goldmine®, and Lotus Notes®. Each client system also includes an intermediate list 112, a client database 114 and a client interface 116. The operation of these components is described in detail below.

Figure 2:
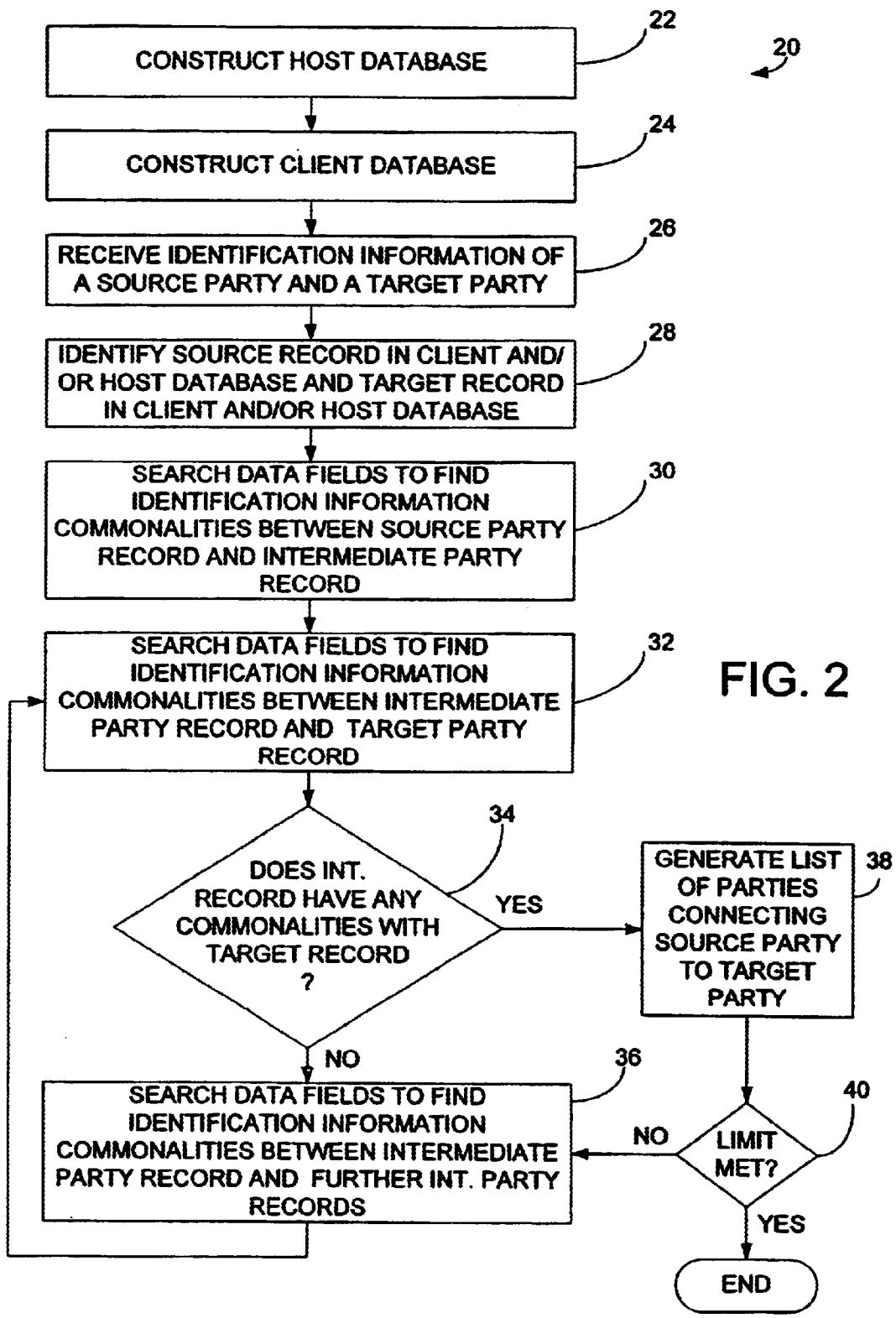
FIG. 2 is a flow diagram showing one embodiment of a method for determining connections between parties in accordance with the present invention.
Figure 3:
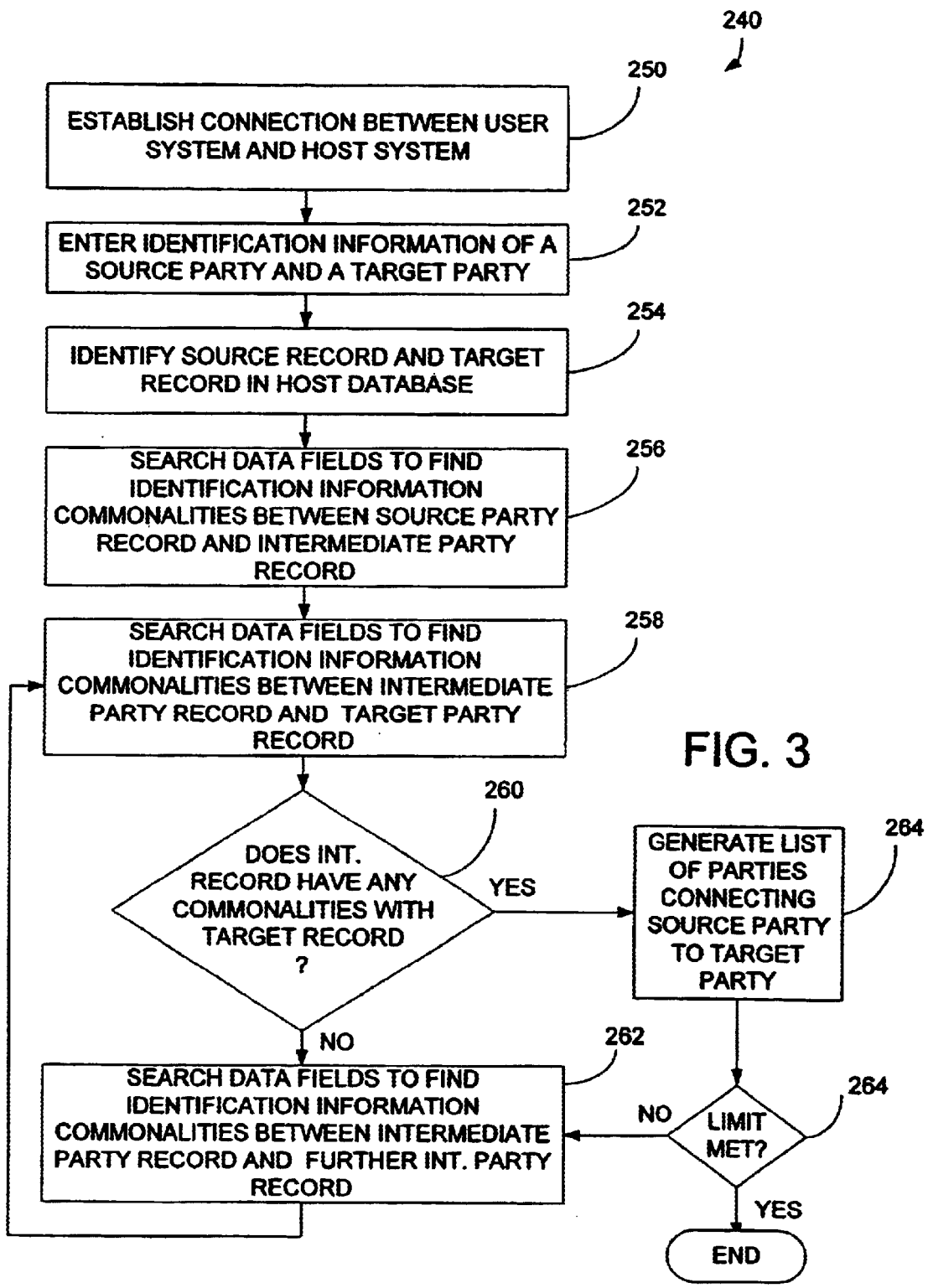

FIG. 2 is a flow diagram 20 which shows the method of determining connection between parties. In step 22, the host database is constructed. This involves populating the database with information about people and entities such as companies, organizations, etc. This information is extracted from non-restricted sources including the SEC database, Market Guide, IPO.com, company websites, news articles, press releases, etc. The information about each person or entity is arranged in a parsable record having a number of data fields. Identification information of the person or entity is input into an appropriate data field. The identification information input into the various data fields includes the name of the person or entity, the address of the person or entity, the person's position in the company, the person's dates of employment with companies the person has worked for, the ticker symbol of the company, the SIC code of the company, etc. Preferably, the majority of the information is obtained through an automated process, such a web crawler, that searches the internet, extracts the appropriate data and inserts the data into the data fields to construct a record of the person or entity. Information not accessible to the automated process is input to the system manually. In this step, relationships between parties may be identified and links between related records established and saved in the database. This enables connections between parties to be included in the records of each party. This step may be repeated as often as necessary to keep the database updated.

In step 24, the client database 114 is constructed. First, the contact data included in the company database 110 is exported to the company list 112, and irrelevant contacts, such as personal contacts and non-business contacts, are eliminated. Redundant contacts are also eliminated. The company list 112 is input to record matching engine 104 where it is compared to the records included on host operation system and database 102. All contacts in the company list 112 that are also included in the host database 102 are stored in the same record form as the host database contacts and these records are saved in client database 114. This step may be repeated as often as necessary to keep the database updated. Accordingly, the data stored in the client database 116 is a subset of the data stored in host database 102. Known relationships between records in the client database 116 can be determined at this point and links between the related records implemented into the records. The information stored in the client database is proprietary to the client and is not accessible by outside parties. Contacts in the company list 112 which are not already on the host database 102 are not saved in the client database 114, since these contacts will not lead to further contacts on the host database 102.

Once the party records have been constructed and stored in the client database 114 and the host database 102, the process of determining connections between parties (people and/or entities) can be executed. In step 26, the host operation system 102 receives identification information of the source party and the target party, which typically are the names of the person or entity, from the client interface 116 of the client system 16 through a connection with the host system 12 via the internet 18. The record associated with source party is then located in the client database 114 if it is stored there. If it is not, it is located in the host database 102, step 28. The record associated with the target party is also located in either the client database 114 or the host database 102. In step 30, the records in the client database 114 and host database 102 are searched by the host operation system to locate commonalities between the identification information in the data fields in the source party record and identification information in the data fields of the records stored in the databases. All intermediate party records which include commonalities with the source party record are identified as first stage intermediate party records. If relationship links between parties within the client database have been previously established, these links are used to locate the connections between the source party record and the first stage intermediate party record. The identification information in the data fields of the first stage intermediate party records are then compared to the identification information in the data fields of the target party record to locate first stage intermediate party records having commonalities with the target party record, step 32. If none of the first stage intermediate party records have any identification information commonalities with the target party record, step 34, the records in the databases are searched to locate further stage intermediate party records having identification information commonalities with the first stage intermediate party records, step 36. The identification information in the further stage intermediate party records is searched to determine if there are any commonalities between any of the data fields in the further stage intermediate party records and the target party record, step 32. Steps 32 through 36 are repeated until an intermediate party record is located which has identification information commonalities with the target party record. When this occurs, the host operation system 102 generates a list of the parties connecting the source party to the target party, step 38, and transmits the list to the client interface 116 via the internet 18. If a preset limit, which limits the number of unique connections found to a predetermined number, which may be set by the client when entering the source and target party information or by the host operation system, is met, step 40, the process ends. If the preset limit is not met, steps 32 through 36 are repeated until the preset limit number of unique connections is met.

An example connections list is schematically shown in FIG. 5. In this example, after the host database 102 and the client database 114 have been constructed, steps 22 and 24, FIG. 2, identification information for a source party 202 and a target party 204 are input to the host operation system 102 over the internet 18 through client interface 116. For simplicity, the entire record of each party is not shown in FIG. 5. Only the relevant identification information for the purposes of this example are shown. Upon receiving the identification information, which typically is the name of the people between whom a connection is to be determined, the records of the source party and the target party are identified in the client and/or host databases, step 28. In this example, the source party 202 is for J.F. who is the Chief Technology Officer of Company A. The target party record 204 is for L.S., the Chief Financial Officer of Company F. In step 30, the host database 102 is searched to locate intermediate party records having identification information commonalities with the source party record 202. In this case, the record 206 of C.O., which indicates that C.O. has identification information including a relationship with Company A as Chief Operating Officer is located. The remaining identification information of the record of C.O. is searched to determine whether there is a commonality between any of the identification information of C.O. and any of the identification information stored in the record of the target party, L.S., step 32. There is a commonality, since the record of C.O. indicates a relationship with Company F as Chief Technology Officer, step 34. Accordingly, a list including the source party record of J.F., the intermediate party record of C.O. and the target party record of L.S. is generated and sent to the client interface 116, step 38. In the list, all of the identification information included data included in the record of each party is available to the client.

A more detailed view of the source party record 202, the target party record 204 and the intermediate party record 206 is shown in FIG. 6. As shown in the figure, the records 202, 204 and 206 include data fields listing identification information such as the name of the person, age, address and relationships to entities such as companies, association, etc. In the example, the commonality between the source party record 202 and the intermediate party record 206 found in step 30 is that both J.F. and C.O. have a relationship with Company A: J.F. as the present CTO and C.O. as a former COO. In step 32, the commonality between the intermediate party record 206 and the target party record 204 is located, namely the relationship of both parties with Company F. As shown in record 204, L.S. is the present CFO of Company F and C.O. is the present COO of Company F.

In FIG. 5, each entity with which the involved parties are associated is indicated by a dashed line. Connections between entities are referred to as hops. Since no entities other than the entities associated with the source party and the target party are needed to make the connection shown by double-dotted, dashed line 208, this connection is referred to as a "one-hop" connection. Other, multiple hop connections between the source party record 202 and the target party record 204 are shown in FIG. 5. Line 210 shows a "two hop" connection. Using the method described above, it is determined that the record of the source party J.F., 202 indicates a relationship between Company A and Company D based on the commonality that J.F. is associated with both companies. A further search in host database 102 indicates a relationship between the record 202 of J.F. and the record 212 of M.P., based on the commonality that both parties have a relationship with Company D. The record 212 of M.P. indicates a relationship with the target record 204 of L.S., based on the commonality that both parties have a relationship with Company F. Accordingly, since one intermediate entity (Company D) is included in the connection 210, this connection is referred to as a "two-hop" connection. Three-hop connections are shown by dotted line 220 and dotted dashed line 222. In this example, if the preset limit of connections is four, in step 40, FIG. 2, the process would end. It will be understood that the preset limit can be set to any number, although, in order to minimize processing time and cumbersome connection lists, the limit preferably is set to no more than 10.

While the example described above shows how connections between two people are generated, the system also determines connections between a person and an entity, such as a company or association; between an entity and a person; and between two entities. Upon constructing the client database 116, a record of the client entity is generated and stored in the client database 116. The host database 102, when being constructed, generates records of entities found in its search of the non-restricted sources in the same manner as the records for people described above. An example entity record 230 is shown in FIG. 7. As shown in the figure, entity record 230 comprises a number of data fields including identification information of the entity, including the entity name, ticker symbol, address and a list of its executives. When an entity is the source party and/or the target party, The same process shown in FIG. 2 is carried out, meaning that intermediate records, which may include records of people or entities, are located which include identification information which is common to the source and or target party records.

In an alternative embodiment, the host operation system and database 102 and the record matching engine 104 are replicated on the client database 114. In this embodiment, all of the operations described above are executed on the client system 16, thus allowing all execution to be local to the client system 16. Furthermore, the system 10 can be utilized to construct a list of connection that are associated with a single party. By inputting a single party to the host operation system and database 102, the searching function described above is executed and, in a first iteration, all records including identification information having commonalities with the source party are located and displayed. Depending on the scope of connections desired, numerous iterations of the search function can be executed in order to locate records of parties connected to the parties located in previous iterations.

While, as described above, the system 10 may be utilized by clients having a proprietary client database, it can also be utilized by a party which does not construct its own database. This process is shown in the flow diagram 240 of FIG. 3. In step 250, the user system 14, FIGS. 1 and 4, establishes a connection over the internet to the host system 12. The user system then enters the source party and the target party, step 252. The host operation system 102 identifies the records associated with the source party and the target party in the host database, step 254. Once the source party record and the target party record are found, steps 256 through 266 are executed, which are identical to steps 30 through 40 shown in flow diagram 20 of FIG. 2.

Accordingly, the present invention enables connections between people and entities to be determined using a convenient and efficient database construction and search tool. The invention is able to provide information about connections between parties based on commonalities in the identification information associated with each of the people and entities. The system can also be used simply for browsing through connections between parties and for obtaining the identification information associated with the record for a particular party. While the application has been described in connection with an example using businesses and business people as the parties, it will be understood that any party could utilize the connection-determining feature of the present invention and be the subject matter, including schools, civic groups, churches, organizations, associations, families, agencies, neighborhoods, etc., and the people who populate such groups.

The invention may be embodied in other specific forms without departing from the spirit or essential characteristics thereof. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

What is claimed is:

1. A method of determining a connection between a source party and a target party comprising:

A. constructing a host database, said host database including a plurality of records, each record including a number of data fields, each of said data fields including identification information of a party, said identification information being extracted from non-restricted sources;

B. constructing a client database, said client database including a plurality of records, each record including a number of data fields, each of said data fields including identification information of a party, said identification information being extracted from a client's private sources;

C. receiving identification information of a source party and a target party;

D. identifying a record in said client database including identification information of said source party;

E. identifying a record in said host database including identification information of said target party;

F. searching said data fields in said records of at least one of said client database and said host database to locate identification information commonalities between said source party record and at least one intermediate party record;

G. searching said data fields in said records of at least one of said client database and said host database to locate identification information commonalities between said at least one intermediate party record and said target party record; and H. upon locating at least one identification information commonality between said at least one intermediate party record and said target party record, generating a list including said at least one intermediate party record.

2. The method of claim 1 wherein step G further includes:
   searching said data fields in said records of at least one of said client database and said host database to locate identification information commonalities between said at least one intermediate party records and further intermediate party records; and
   searching said data fields in said records of at least one of said client database and said host database to locate identification information commonalities between said further intermediate party records and said target party record.

3. The method of claim 2 wherein said source party is one of a person and an entity and said target party is one of a person and an entity.

4. The method of claim 3 wherein said identification information includes personal and affiliation information of said party.

5. The method of claim 4 wherein said identification information includes at least one of a person's name, said person's dates of employment with a company, said person's title within said company, said person's company name, said person's company address, said person's company SIC code, and said person's company ticker symbol.

6. The method of claim 3 wherein said identification information includes at least one of a company name, said company's address, said company's SIC code and said company's ticker symbol.

7. The method of claim 3 wherein said records stored on said client database are a subset of said records stored on said host database.

8. A method of determining a connection between a source party and a target party comprising:
   A. constructing a host database, said host database including a plurality of records, each record including a number of data fields, each of said data fields including identification information of a party, said identification information being extracted from non-restricted sources;
   B. receiving identification information of a source party and a target party;
   C. identifying a record in said host database including identification information of said source party;
   D. identifying a record in said host database including identification information of said target party;
   E. searching said data fields in said records of said host database to locate identification information commonalities between said source party record and at least one intermediate party record;
   F. searching said data fields in said records of said host database to locate identification information commonalities between said at least one intermediate party record and said target party record; and
   G. upon locating a data field commonality between said at least one intermediate party record and said target party record, generating a list of said at least one intermediate party record.

9. The method of claim 8 wherein step F further includes:
   searching said data fields in said records of said host database to locate identification information commonalities between said at least one intermediate party records and further intermediate party records; and
   searching said data fields in said records of said host database to locate identification information commonalities between said further intermediate party records and said target party record.

10. The method of claim 9 wherein said source party is one of a person and an entity and said target party is one of a person and an entity.

11. The method of claim 10 wherein said identification information includes personal and affiliation information of said party.

12. The method of claim 11 wherein said identification information includes at least one of a person's name, said person's dates of employment with a company, said person's title within said company, said person's company name, said person's company address, said person's company SIC code, and said person's company ticker symbol.

13. The method of claim 10 wherein said identification information includes at least one of a company name, said company's address, said company's SIC code and said company's ticker symbol.

14. The method of claim 10 wherein said records stored on said client database are a subset of said records stored on said host database.

15. A system for determining a connection between a source party and a target party comprising:
   a host system including a computer processor and associated memory, said host system including a host database including a plurality of records, each record including a number of data fields, each of said data fields including identification information of a party, said identification information being extracted from non-restricted sources;
   a client system including a computer processor and associated memory, said client system including a client database including a plurality of records, each record including a number of data fields, each of said fields including identification information of a party, said identification information being extracted from a client's private sources;
   said client system establishing a connection to said host system over said communication network and inputting identification information of a source party and a target party;
   said host system identifying a record in at least on of said client database and said host database including identification information of said source party and identifying a record in at least one of said client database and said host database including identification information of said target party;
   said host system searching said data fields in said records to locate identification information commonalities between said source party record and at least one intermediate party record and searching said data fields in said records to locate identification information commonalities between said at least one intermediate party record and said target party record; and
   upon locating a identification information commonality between said at least one intermediate party record and said target party record, said host system generating a list of said at least one intermediate party record.

16. A system for determining a connection between a source party and a target party comprising:
   a host system including a computer processor and associated memory, said host system including a database including a plurality of records, each record including a number of data fields, each of said data fields including identification information of a party, said identification information being extracted from non-restricted sources;
   a user system including a computer processor and associated memory, said user system being adapted for establishing a connection to said host system over a communication network, said user system inputting identification information of a source party and a target party to said host system;

said host system identifying records in said database including identification information of said source party identification information of said target party;

said host system searching said data fields in said records to locate identification information commonalities between said source party record and at least one intermediate party record and searching said data fields in said records to locate identification information commonalities between said at least one intermediate party record and said target party record; and upon locating a identification information commonality between said at least one intermediate party record and said target party record, said host system generating a list of said at least one intermediate party record.

17. A method of determining a connection between a source party and a target party comprising:

A. receiving identification information of a source party and a target party;

B. identifying a record in a client database including identification information of said source party, said client database including a plurality of records, each record including a number of data fields, each of said data fields including identification information of a party;

C. identifying a record in a host database including identification information of said target party, said host database including a plurality of records, each record including a number of data fields, each of said data fields including identification information of a party;

D. searching said data fields in said records of at least one of said client database and said host database to locate identification information commonalities between said source party record and at least one intermediate party record;

E. searching said data fields in said records of at least one of said client database and said host database to locate identification information commonalities between said at least one intermediate party record and said target party record; and F. upon locating at least one identification information commonality between said at least one intermediate party record and said target party record, generating a list including said at least one intermediate party record.

18. A method of determining a connection between a source party and a target party comprising:

A. receiving identification information of a source party and a target party;

B. identifying a record in a host database including identification information of said source party, said host database including a plurality of records, each record including a number of data fields, each of said data fields including identification information of a party, said identification information being extracted from non-restricted sources;

C. identifying a record in said host database including identification information of said target party;

D. searching said data fields in said records of said host database to locate identification information commonalities between said source party record and at least one intermediate party record;

E. searching said data fields in said records of said host database to locate identification information commonalities between said at least one intermediate party record and said target party record; and F. upon locating a data field commonality between said at least one intermediate party record and said target party record, generating a list of said at least one intermediate party record.

19. A system for determining a connection between a source party and a target party comprising:

a host system including a computer processor and associated memory, said host system including a database including a plurality of records, each record including a number of data fields, each of said data fields including identification information of a party;

a user system including a computer processor and associated memory, said user system being adapted for establishing a connection to said host system over a communication network, said user system inputting identification information of a source party and a target party to said host system;

said host system identifying records in said database including identification information of said source party identification information of said target party;

said host system searching said data fields in said records to locate identification information commonalities between said source party record and at least one intermediate party record and searching said data fields in said records to locate identification information commonalities between said at least one intermediate party record and said target party record; and upon locating a identification information commonality between said at least one intermediate party record and said target party record, said host system generating a list of said at least one intermediate party record.

* * * * *

UNITED STATES PATENT AND TRADEMARK OFFICE
CERTIFICATE OF CORRECTION

PATENT NO.    : 6,697,807 B2
DATED         : February 24, 2004
INVENTOR(S)   : John S. McGeachie It is certified that error appears in the above-identified patent and that said Letters Patent is hereby corrected as shown below:

Column 12,
Line 40, after "at least", delete "on", and insert thereof -- one --;
Line 53, after "locating", delete "a", and insert thereof -- an --;

Column 13,
Line 15, after "locating", delete "a", and insert thereof -- an --;

Column 14,
Line 49, after "locating", delete "a", and insert thereof -- an --;

Signed and Sealed this

Sixth Day of July, 2004

JON W. DUDAS
*Acting Director of the United States Patent and Trademark Office*